United States Patent
Nishi

(10) Patent No.: US 10,698,820 B2
(45) Date of Patent: Jun. 30, 2020

(54) STORAGE DEVICE AND STORAGE METHOD

(71) Applicant: FUJITSU LIMITED, Kawasaki-shi, Kanagawa (JP)

(72) Inventor: Hidetoshi Nishi, Nagano (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/368,917

(22) Filed: Mar. 29, 2019

(65) Prior Publication Data
US 2019/0317896 A1     Oct. 17, 2019

(30) Foreign Application Priority Data

Apr. 17, 2018   (JP) ................................ 2018-079311

(51) Int. Cl.
G06F 12/08       (2016.01)
G06F 12/0804     (2016.01)
G06F 3/06        (2006.01)

(52) U.S. Cl.
CPC ........ G06F 12/0804 (2013.01); G06F 3/0604 (2013.01); G06F 3/065 (2013.01);
(Continued)

(58) Field of Classification Search
CPC .... G06F 12/0804; G06F 3/0604; G06F 3/067; G06F 3/0644; G06F 3/065; G06F 3/068; G06F 2212/1032; G06F 2212/608
See application file for complete search history.

(56) References Cited

U.S. PATENT DOCUMENTS 8,595,453 B2 * 11/2013 Iwamura ............. G06F 11/2076
                                                      711/162
8,892,847 B2 * 11/2014 Imazaki ................ G06F 3/0608
                                                      711/114
(Continued)

FOREIGN PATENT DOCUMENTS

JP    2006-146951    6/2006
JP    2007-310715   11/2007
JP    2012-137870    7/2012

OTHER PUBLICATIONS

Z. Sun, M. Guo, H. Dong, Y. Liu, Z. Liu and L. Xu, "RALD: Reliable Transactional Software Controller for Redundancy Array of Log Structured Disks," 2015 IEEE 17th International Conference on High Performance Computing and Communications, New York, NY, 2015, pp. 110-121 (Year: 2015).*

*Primary Examiner* — Khoa D Doan
(74) *Attorney, Agent, or Firm* — Fujitsu Patent Center

(57) ABSTRACT

A storage device includes a cache memory and a processor configured to perform, in accordance with an amount of dirty data stored in the cache memory, a determination of a first physical volume and a first logical volume placed in the first physical volume from the plurality of physical volumes and the plurality of logical volumes placed in the plurality of physical volumes, perform selection, from a first plurality of physical volumes in which the determined first logical volume is placed by mirroring, of a second physical volume other than the determined first physical volume, and perform selection, from the plurality of physical volumes, of a third physical volume other than the second plurality of physical volumes, and write data of the first logical volume read from the second physical volume, to the third physical volume, and delete the first logical volume from the determined first physical volume.

13 Claims, 10 Drawing Sheets

(52) U.S. Cl.
CPC ............ *G06F 3/068* (2013.01); *G06F 3/0644* (2013.01); *G06F 2212/1032* (2013.01); *G06F 2212/608* (2013.01)

(56) References Cited

U.S. PATENT DOCUMENTS

| | | | |
|---|---|---|---|
| 10,152,270 B2* | 12/2018 | Sato | G06F 3/0617 |
| 2011/0179188 A1* | 7/2011 | Nakagawa | G06F 3/0613 709/240 |
| 2012/0166395 A1 | 6/2012 | Kaijima et al. | |

* cited by examiner

FIG. 1A

| REPLACEMENT OF RELATED ART | RLU#0 VOL#00 - VOL#01 | | RLU#1 VOL#10 - VOL#11 | | RLU#2 VOL#20 - VOL#21 | |
|---|---|---|---|---|---|---|
| LOGICAL VOLUME#0 | ○ | ○ | | | | |
| LOGICAL VOLUME#1 | | | ○ | ○ | | |
| LOGICAL VOLUME#2 | | | | | ○ | ○ |
| LOGICAL VOLUME#3 | ○ | ○ | | | | |
| LOGICAL VOLUME#4 | | | ○ | ○ | | |
| LOGICAL VOLUME#5 | | | | | ○ | ○ |

FIG. 1B

| REPLACEMENT ACCORDING TO EMBODIMENT | VIRTUAL RAID-1 DEVICE | | | | | |
|---|---|---|---|---|---|---|
| | VOL#00 | VOL#01 | VOL#10 | VOL#11 | VOL#20 | VOL#21 |
| LOGICAL VOLUME#0 | ○ | ○ | | | | |
| LOGICAL VOLUME#1 | | ○ | ○ | | | |
| LOGICAL VOLUME#2 | | | ○ | ○ | | |
| LOGICAL VOLUME#3 | | | | ○ | ○ | |
| LOGICAL VOLUME#4 | | | | | ○ | ○ |
| LOGICAL VOLUME#5 | ○ | | | | | ○ |

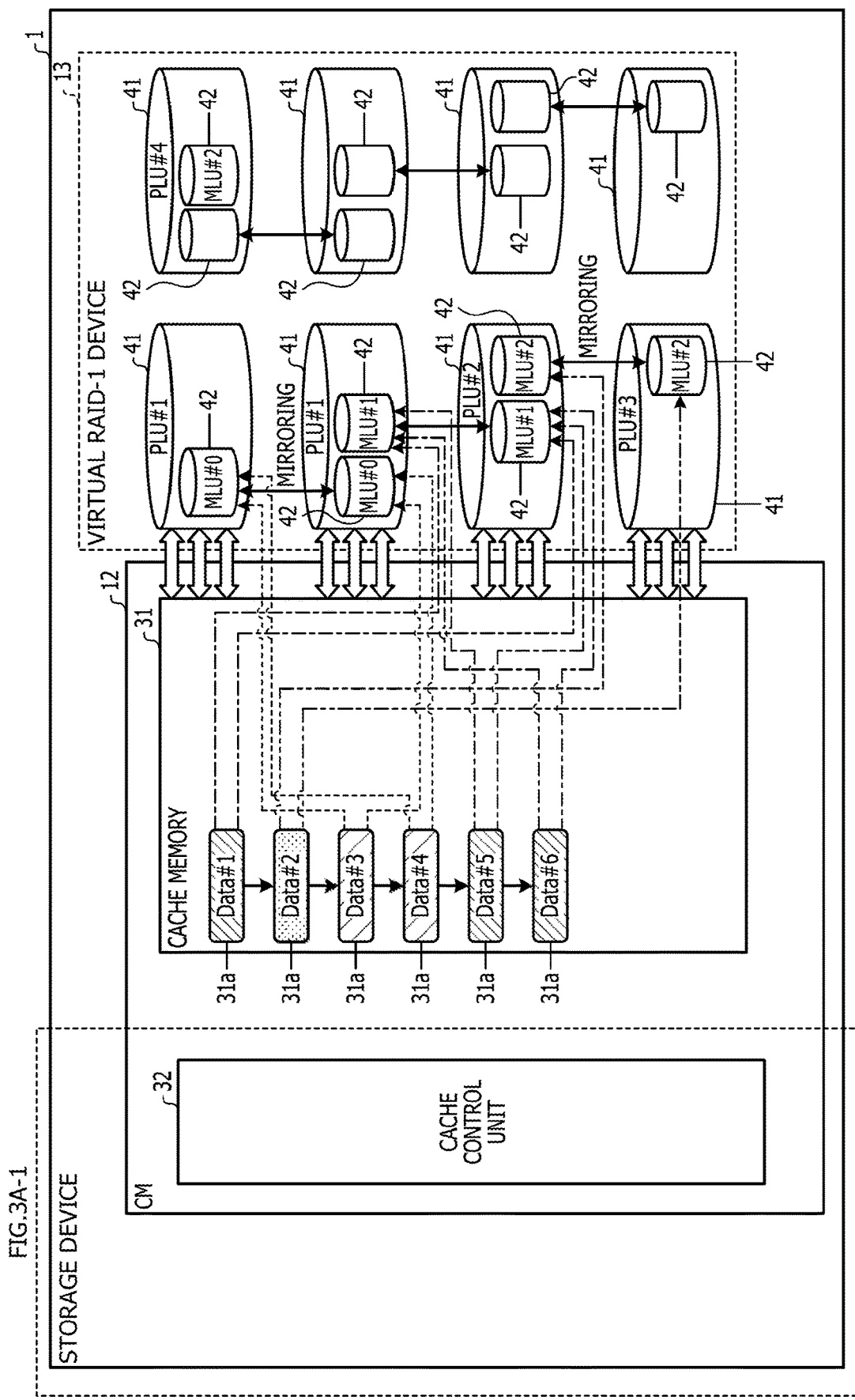

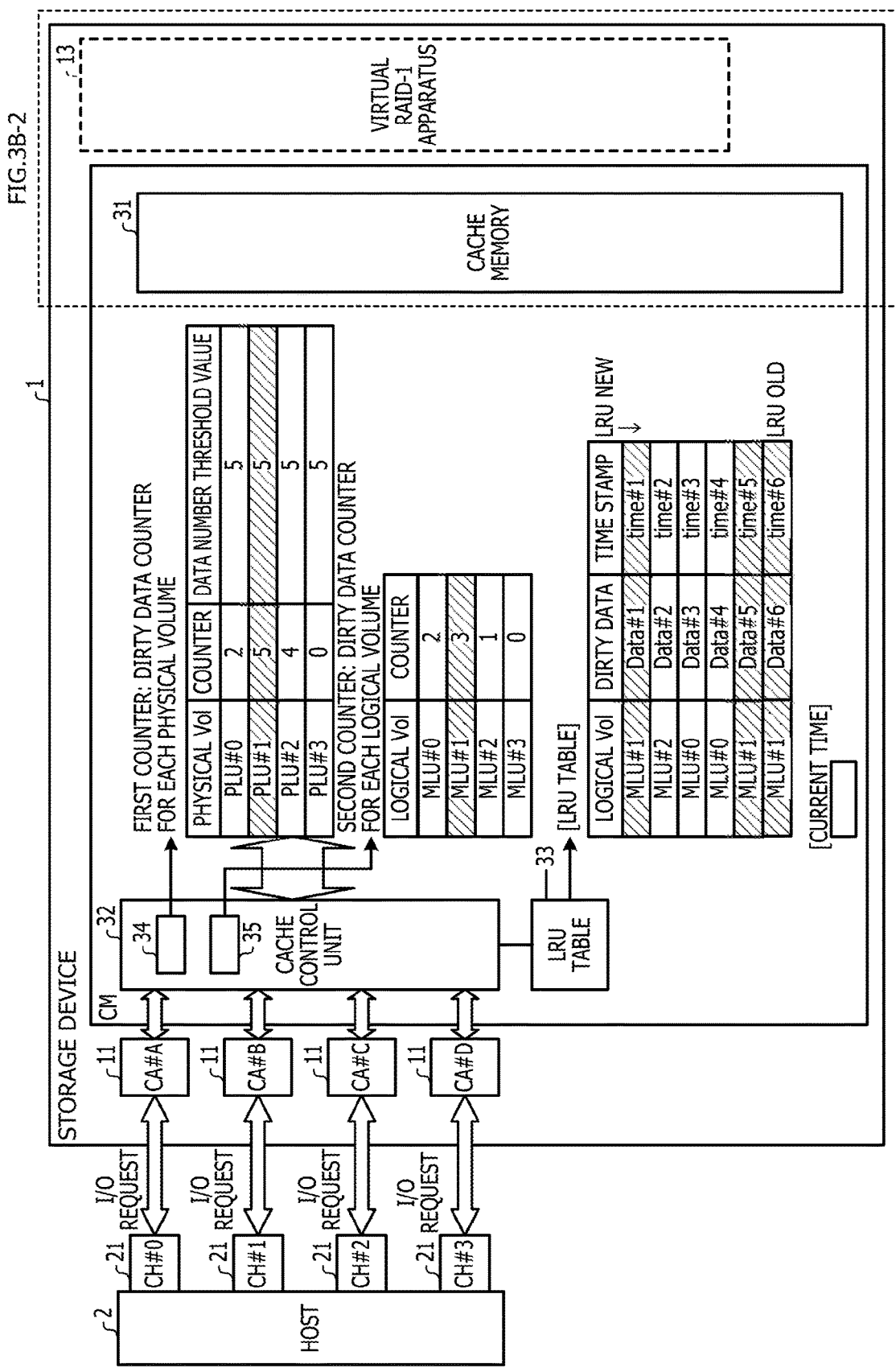

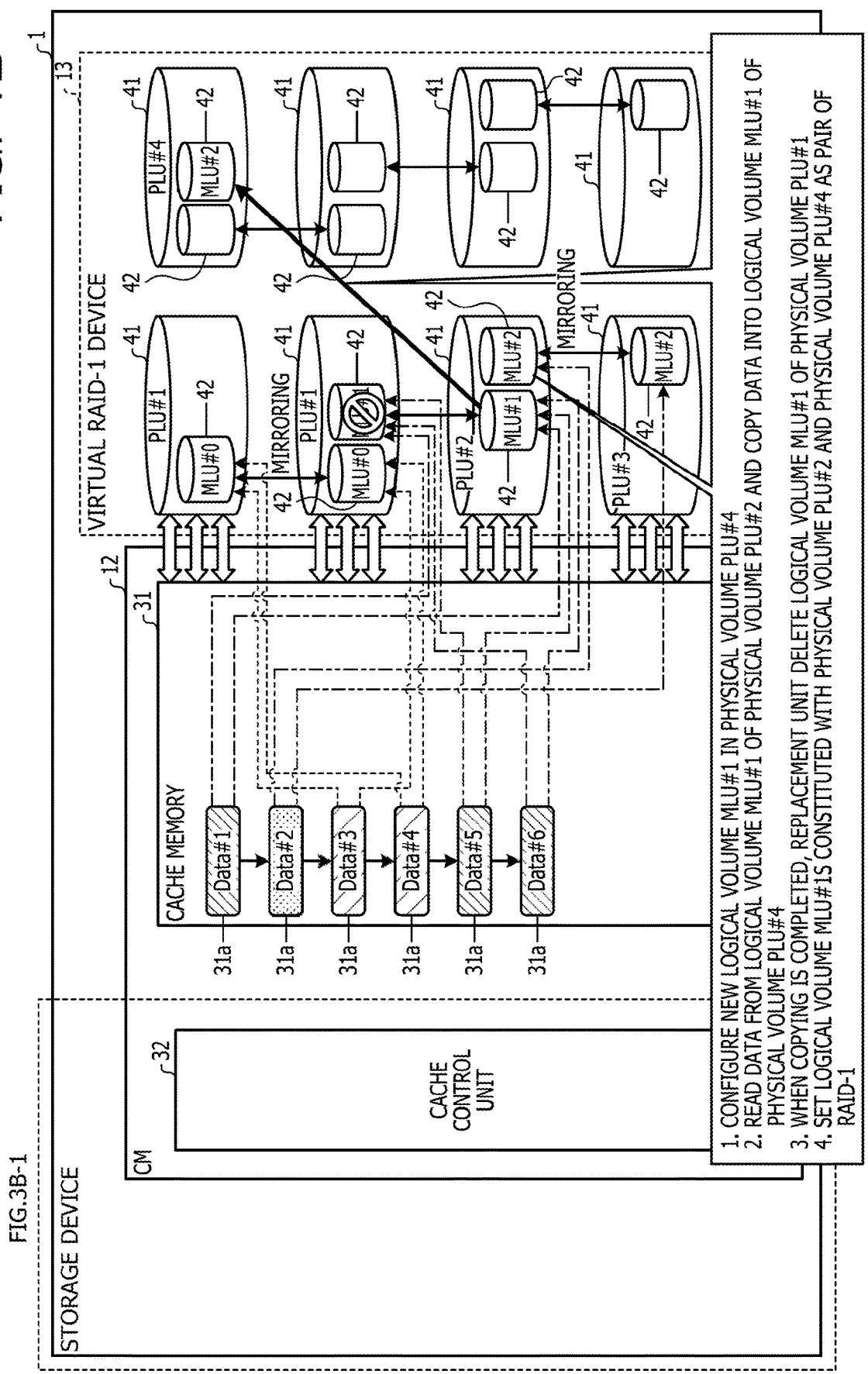

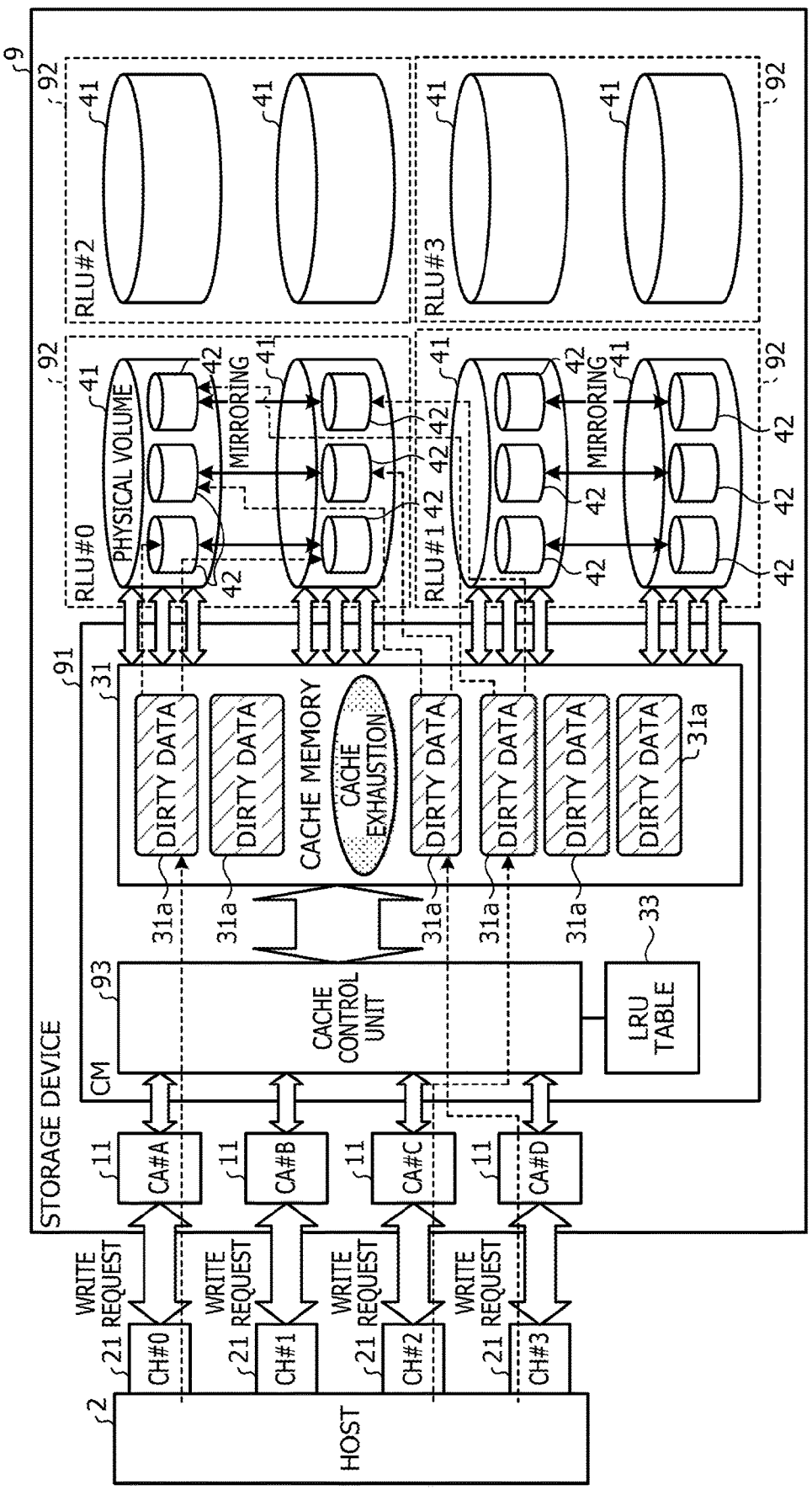

STORAGE DEVICE AND STORAGE METHOD

CROSS-REFERENCE TO RELATED APPLICATION

This application is based upon and claims the benefit of priority of the prior Japanese Patent Application No. 2018-79311, filed on Apr. 17, 2018, the entire contents of which are incorporated herein by reference.

FIELD

The embodiment discussed herein is related to storage technology.

BACKGROUND

In recent years, for example, in a storage device used in a mainframe, many logical volumes are included in the physical volume since a capacity of a physical volume becomes larger than a size of a logical volume. The logical volume is a logical storage area in which an application stores data, and the physical volume is a physical storage area of a nonvolatile storage device which actually stores the data.

Since input and output (I/O) processing between a host and the storage device is parallelized, writing of the data to the plurality of logical volumes is performed in parallel. The host is an information processing device on which the application operates.

FIG. 8 is a diagram illustrating an example of writing the data from the host to the logical volume. As illustrated in FIG. 8, the host 2 may perform four writes in parallel through four channels 21 represented by a CH #0 to a CH #3.

A storage device 9 accepts a write request by using a CA # A to a CA # D respectively associated with the CH #0 to the CH #3. The CA # A to CA # D are channel adapters (CA) 11. The CA # A to CA # D pass the received write request to a controller module (CM) 91.

The CM 91 controls the storage device 9, and writes the data written in the storage device 9 by the host 2 into a RAID group logical unit (RLU) 92 represented by an RLU #0 to an RLU #3. The RLU 92 has two physical volumes 41, mirrors the data written in the storage device 9 by the host 2, and stores the data in two logical volumes 42. The two logical volumes 42 are placed in separate physical volumes 41.

The CM 91 has a cache memory 31, a cache control unit 93, and a least recently used (LRU) table 33. The cache memory 31 temporarily stores the data to be written to the RLU 92 and the data read from the RLU 92 on a cache page basis. The cache memory 31 stores the data to be written in the RLU 92 as dirty data 31a.

The cache control unit 93 controls writing of the data and reading of the data by using the cache memory 31. When the cache memory 31 is exhausted, the cache control unit 93 releases the cache memory 31 on a cache page basis based on the LRU table 33.

The LRU table 33 stores information of cache pages in the order in which the cache pages are not used. When the cache memory 31 is exhausted, the cache control unit 93 takes out information of the cache page from a head of the LRU table 33 and releases the cache page. At this time, the dirty data 31a, for example, the cache page which became dirty after being written, is written back to the RLU 92.

As a technology relating to mirroring in related art, there is a technology for generating an optimum mirror server group according to an access load situation on an origin server by adapting any node in a network as a mirror server. In the technology, when the origin server performs dynamic mirroring of content, an adaptive mirror node detecting unit detects an adaptive mirror node in the network, and a dynamic mirror destination determining unit selects the adaptive mirror node of a mirror destination. A dynamic mirror request unit performs a dynamic mirror request to the selected adaptive mirror node, and when the request is accepted, the mirror content is transferred by a dynamic mirror unit. The adaptive mirror node stores the received mirror content in a mirror content storage unit and functions as the mirror server.

There is a dynamic load balancing storage method which reduces delay of a response when a load concentrates on a certain hard disk drive, which is not predicted beforehand, and reduces degradation of a service. The dynamic load balancing storage method monitors a degree of load concentration on each hard disk drive and copies content of a detected overload hard disk drive to a mirror hard disk drive. In the dynamic load balancing storage method, part of an access request to the overload hard disk drive is regarded as an access request to the mirror hard disk drive, and access is executed.

There is a technology in related art in which reading performance from a table is enhanced by acquiring an access instruction accessing a database, predicting the table to be accessed in accordance with the acquired access instruction, and mirroring the predicted table among a plurality of storage devices.

For example, Japanese Laid-open Patent Publication Nos. 2006-146951, 2007-310715, and 2012-137870 discuss the above related technologies.

SUMMARY

According to an aspect of the embodiments, a storage device includes a cache memory and a processor configured to perform, in accordance with an amount of dirty data stored in the cache memory, a determination of a first physical volume and a first logical volume placed in the first physical volume from the plurality of physical volumes and the plurality of logical volumes placed in the plurality of physical volumes, perform selection, from a first plurality of physical volumes in which the determined first logical volume is placed by mirroring, of a second physical volume other than the determined first physical volume, and perform selection, from the plurality of physical volumes, of a third physical volume other than the second plurality of physical volumes, and write data of the first logical volume read from the second physical volume, to the third physical volume, and delete the first logical volume from the determined first physical volume.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 1A and 1B are diagrams for explaining placement of logical volumes by a storage device according to an embodiment;

FIGS. 3A and 3B are diagrams illustrating a specific example of a logical volume to be replaced;

FIGS. 4A and 4B are diagrams illustrating replacement of the logical volume to be replaced;

FIG. 8 is a diagram illustrating an example of writing data from a host to a logical volume.

DESCRIPTION OF EMBODIMENTS

Figure 2:
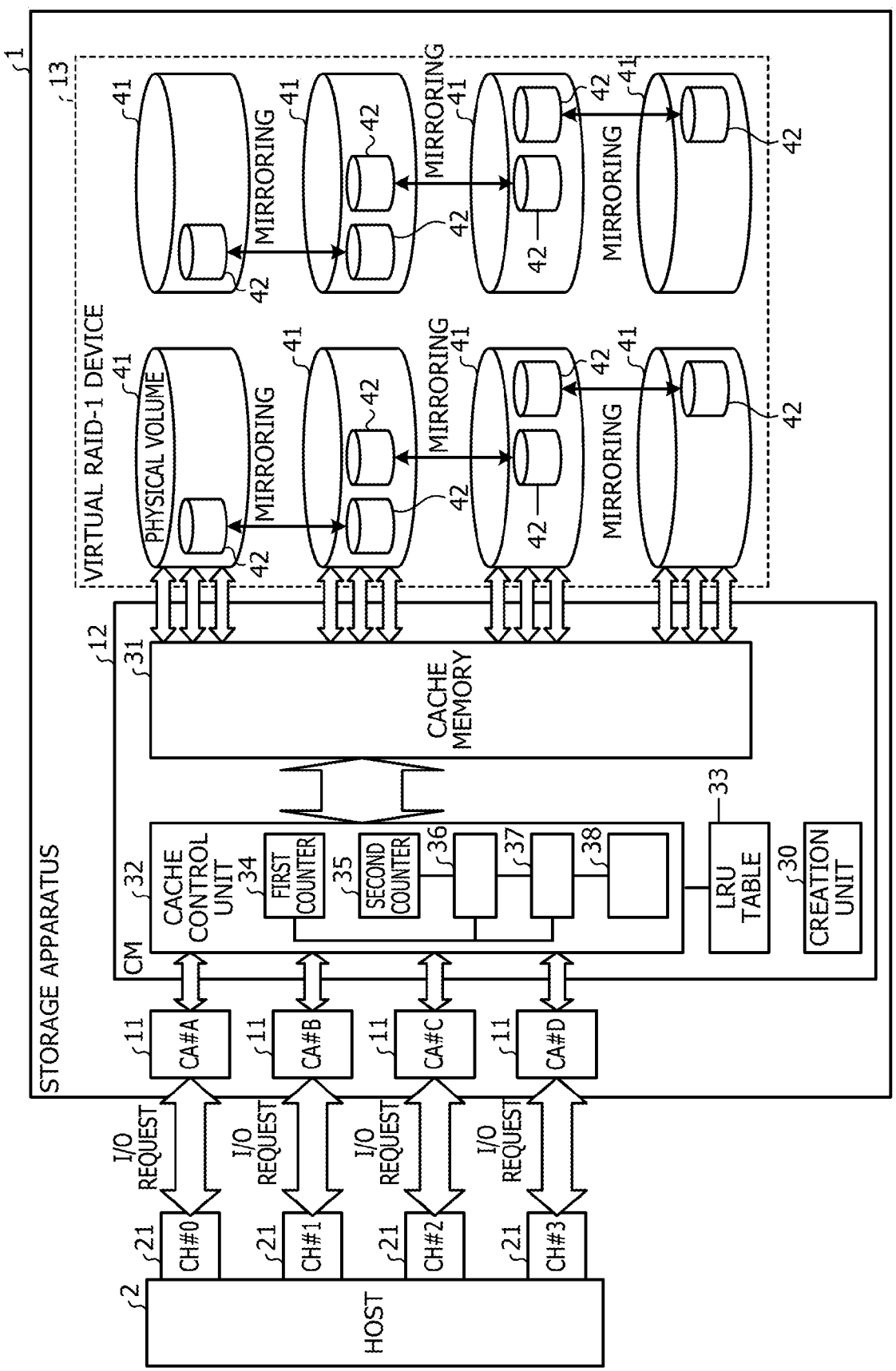
FIG. 2 is a diagram illustrating a configuration of the storage device according to the embodiment.

In FIG. 8, when dirty data 31a is written back to RLU 92, a write-back destination may concentrate on one RLU 92. In FIG. 8, write-back of three dirty data 31a is concentrated on an RLU #0. Completion of the write-back of the dirty data 31a is delayed, and release of a cache page is delayed, so that data writing processing is delayed. When the data writing processing is delayed, the monitoring timer detects timeout and the data writing processing ends in error.

Therefore, a designer determines a physical volume 41 which is a placement destination of a logical volume 42 so as not to bias I/O. However, according to an addition or a change of a job during operation of an information processing system, an I/O characteristic of the information processing system changes, and the bias of the I/O to a specific physical volume 41 occurs. Accordingly, the designer performs replacement of the logical volume 42 to the physical volume 41, but in order to perform the replacement, it may be desirable to read data of the logical volume 42 from the physical volume 41 with a high load due to the biased I/O. Thus, in technology in related art, there is a problem in which the load of the physical volume 41 with the high load becomes higher due to the replacement.

An embodiment of a storage device and a storage method disclosed in the present disclosure will be described in detail below with reference to the drawings. It may be noted that the embodiment does not limit the disclosed technology.

Placement of logical volumes by the storage device according to the embodiment will be described. FIGS. 1A and 1B are diagrams for explaining placement of the logical volumes by a storage device according to an embodiment. FIG. 1A illustrates the placement in related art, and FIG. 1B illustrates the placement according to the embodiment. In FIGS. 1A and 1B, a VOL #00 to a VOL #21 are physical volumes.

As illustrated in FIG. 1A, in related art, a RAID-1 is configured with two physical volumes. In FIG. 1A, an RLU #0 configures the RAID-1 with a VOL #00 and a VOL #01, an RLU #1 configures the RAID-1 with a VOL #10 and a VOL #11, and an RLU #2 configures the RAID-1 with a VOL #20 and a VOL #21.

A logical volume #0 and a logical volume #3 are placed in the RLU #0. For example, the logical volume #0 and logical volume #3 are mirrored and placed in the VOL #00 and the VOL #01. Likewise, a logical volume #1 and a logical volume #4 are placed in the RLU #1. For example, the logical volume #1 and logical volume #4 are mirrored and placed in the VOL #10 and the VOL #11. A logical volume #2 and a logical volume #5 are placed in the RLU #2. For example, the logical volume #2 and logical volume #5 are mirrored and placed in the VOL #20 and the VOL #21.

In this manner, in related art, the logical volume is mirrored and placed in the RLU. Therefore, when a write load of the physical volume in which one of the two logical volumes is placed is high, a write load of the physical volume in which the other logical volume is placed also increases. For example, when a write load of the VOL #00 is high, a write load of the VOL #01 also increases.

On the other hand, as illustrated in FIG. 1B, there is no RLU framework in the placement of the logical volumes according to the embodiment. For example, a pair of physical volumes in which the logical volumes are mirrored and placed are any of two physical volumes among all the physical volumes. The pair of physical volumes is chosen so that the number of the logical volumes mirrored to the same pair is as small as possible.

In FIG. 1B, at least one logical volume of the newly created redundant logical volumes and at least one logical volume of the previously created redundant logical volumes are placed in the different physical volumes. For example, the logical volume #0 is placed in the VOL #00 and the VOL #01, but the next logical volume #1 is placed in the VOL #01 and the VOL #10. All the physical volumes virtually constitute a virtual RAID-1 device, and the logical volume is placed in the two physical volumes in the physical volume group constituting the virtual RAID-1 device.

In this manner, in the logical volume placement according to the embodiment, the pair of physical volumes when the logical volume is created is selected so that the number of the logical volumes mirrored in the same pair is minimized. Therefore, even when a write load of the physical volume in which one of the two logical volumes is placed is high, a write load of the physical volume in which the other logical volume is placed is not as high as the write load of the physical volume in which the one logical volume is placed.

For example, for the logical volume #0, the write load of the VOL #01 is not as high as the write load of the VOL #00 even when the write load of the VOL #00 is high. The case where the write load of the VOL #00 is high is a case where the write load of the logical volume #0 and the logical volume #5 is high. In this case, data of the logical volume #0 is written to the VOL #01 in addition to the VOL #00, but since data of the logical volume #5 is written to the VOL #21 in addition to the VOL #00, the write load of the VOL #01 is not as high as the write load of the VOL #00.

Therefore, when the logical volume is replaced, the storage device according to the embodiment reads the data from the logical volume of the physical volume in which the write load is not high rather than reading the data from the logical volume of the physical volume with the high write load. Therefore, the storage device according to the embodiment may reduce reading of the data of the logical volume from the physical volume with the high load when the logical volume is replaced.

Next, a configuration of the storage device according to the embodiment will be described. FIG. 2 is a diagram illustrating the configuration of the storage device according to the embodiment. As illustrated in FIG. 2, the storage device 1 according to the embodiment includes four CAs 11 represented by a CA # A to a CA # D, a CM 12, and a virtual RAID-1 device 13.

The CA 11 is an interface with a host 2 which uses the storage device 1. The CA 11 receives an I/O request from the CH 21 of the host 2 and passes the I/O request to the CM 12.

The CA 11 receives a response to the I/O request from the CM 12 and transmits the response to the host 2.

The CM 12 controls the storage device 1. In the virtual RAID-1 device 13, the logical volume 42 is mirrored and placed. The virtual RAID-1 device 13 has the eight physical volumes 41, and the logical volumes 42 are placed in two physical volumes 41. The virtual RAID-1 device 13 may have the physical volumes 41 of three or more and a number other than eight.

The CM 12 has a creation unit 30, a cache memory 31, a cache control unit 32, and an LRU table 33.

The creation unit 30 receives a creation instruction of the logical volume 42, selects the physical volumes 41 as a pair of two, and creates the logical volumes 42 in the selected pair. The creation unit 30 selects the pair of the physical volumes so that the number of the logical volumes mirrored to the same pair is minimized. When the number of the logical volumes mirrored to the same pair is equal, the creation unit 30 selects two physical volumes 41 based on an I/O volume and a placement number of the logical volumes 42.

For example, when the number of the logical volumes mirrored to the same pair is equal, the creation unit 30 selects the physical volume 41 in descending order of the I/O volume, and as for the physical volumes 41 having the same I/O volume, the physical volume 41 having the small placement number of the logical volumes 42 is selected.

The cache memory 31 temporarily stores the data to be written to the virtual RAID-1 device 13 and the data read from the virtual RAID-1 device 13 on a cache page basis. The cache memory 31 stores the cache page including the data to be written in the virtual RAID-1 device 13 as the dirty data.

The cache control unit 32 controls reading of the data from the virtual RAID-1 device 13 and writing of the data to the virtual RAID-1 device 13 by using the cache memory 31. Upon receiving a data read request, the cache control unit 32 reads data from the cache memory 31 and passes the data to the CA 11 when there is the data in the cache memory 31. On the other hand, when the data does not exist in the cache memory 31, the cache control unit 32 reads the data from the virtual RAID-1 device 13 on a cache page basis, writes the data in the cache memory 31, and passes the data requested for reading to the CA 11.

Upon receiving a data write request, the cache control unit 32 writes data in the cache memory 31 when there is a cache page including a data write destination in the cache memory 31. On the other hand, when there is no cache page including the data write destination in the cache memory 31, the cache control unit 32 reads the cache page including the data write destination from the virtual RAID-1 device 13 and writes the cache page in the cache memory 31. The cache control unit 32 then writes the data requested for writing into the cache memory 31.

When there is no space in the cache memory 31, the cache control unit 32 selects a cache page to be released based on the LRU table 33, releases the selected cache page, and secures a free area. During releasing the cache page, when the cache page is dirty, for example, when the cache page is written and write-back is not performed on the virtual RAID-1 device 13, the cache control unit 32 write-backs the cache page.

The LRU table 33 stores information of the cache pages in the order in which the cache pages are not used. The information of the cache page includes information on the logical volume 42 including the cache page, information indicating whether or not the cache page is dirty, and a time stamp indicating a time at which the cache page is written.

The cache control unit 32 includes a first counter 34, a second counter 35, a specifying unit 36, a selecting unit 37, and a replacement unit 38.

The first counter 34 is a counter for recording the number of the dirty data for each physical volume. The second counter 35 is a counter for recording the number of the dirty data for each logical volume.

The specifying unit 36 specifies the physical volume 41 with the high load due to the biased I/O and specifies the logical volume 42 to be replaced from the logical volumes 42 placed in the specified physical volume 41. In the physical volume 41 with a high load due to the biased I/O, the write-back of the dirty data stagnates and the number of the dirty data increases. It is considered that a usage rate of the cache memory 31 increases in conjunction with an increase of the dirty data.

Therefore, the specifying unit 36 first determines whether or not the usage rate of the cache memory 31 is equal to or higher than a predetermined usage rate threshold value. When the usage rate of the cache memory 31 is equal to or higher than the predetermined usage rate threshold value, the specifying unit 36 specifies the physical volume 41 whose value of the first counter 34 is equal to or larger than a data number threshold value. The specifying unit 36 then specifies the logical volume 42 having the largest value of the second counter 35 among the logical volumes 42 placed in the specified physical volume 41.

However, immediately after writing from the host 2 temporarily concentrates on the specific logical volume 42, the number of the dirty data increases. Therefore, it may be desirable for the specifying unit 36 to distinguish whether the increase in the number of the dirty data is due to the stagnation of the write-back of the dirty data, or due to an occurrence in which writing from the host 2 temporarily concentrated on the specific logical volume 42.

To determine the distinction, the specifying unit 36 uses the time stamp added to the dirty data. A generation timing of the dirty data in which the write-back is stagnant is earlier than a generation timing of the dirty data generated by the writing from the host 2 temporarily concentrated on the specific logical volume 42. Therefore, the specifying unit 36 determines whether or not the time stamps of all the dirty data of the specified logical volume 42 among the dirty data in the LRU table 33 are earlier than a current time by a predetermined time or more. When the time stamps of all the dirty data of the specified logical volume 42 are earlier than the current time by the predetermined time or more, the specifying unit 36 determines that the stagnation of the write-back of the dirty data is caused by the increase in the number of the dirty data.

When it is determined that the stagnation of the write-back of the dirty data is caused by the increase in the number of the dirty data, the specifying unit 36 sets the specified logical volume 42 as the logical volume 42 to be replaced.

The selecting unit 37 selects the physical volume 41, which is not specified as the physical volume 41 in which the write-back is stagnant, as a data read source of the logical volume 42 to be replaced, among the two physical volumes 41 in which the logical volume 42 to be replaced is placed. The selecting unit 37 selects the one physical volume 41, in which a value thereof of the first counter 34 is smaller, as the data read source of the logical volume 42 to be replaced, among the two physical volumes 41 in which the logical volume 42 to be replaced is placed. The reason is that the physical volume 41 having the larger value of the first counter 34 is the physical volume 41 specified as having the stagnant write-back.

The selecting unit 37 selects the physical volume 41 having the smallest value of the first counter 34 as the physical volume 41 of a replacement destination, among the physical volumes 41 having space volume of the logical volume 42 to be replaced other than the physical volume 41 as the data read source.

The replacement unit 38 reads the data from the physical volume 41 which is the data read source of the logical volume 42 to be replaced, writes the data to the physical volume 41 of the replacement destination, and creates a copy of the logical volume 42 to be replaced in the physical volume 41 of the replacement destination. The replacement unit 38 deletes the logical volume 42 to be replaced placed in the physical volume 41 which did not become the data read source of the logical volume 42 to be replaced, for example, in the physical volume 41 in which the write-back is stagnant.

Figure 3A:
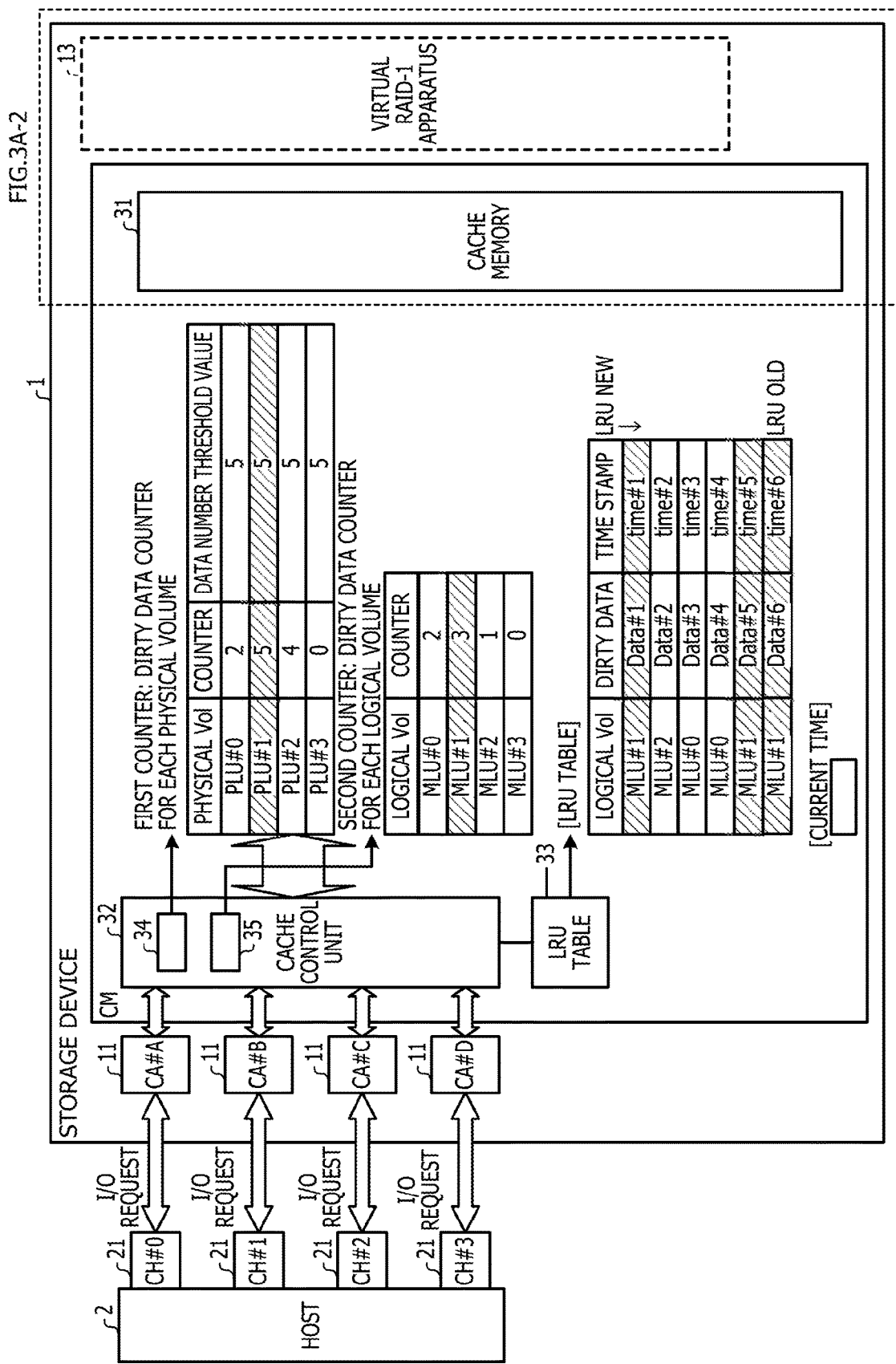

Next, an example of replacement of the logical volume 42 will be described. FIGS. 3A and 3B are diagrams illustrating a specific example of the logical volume 42 to be replaced, and FIGS. 4A and 4B are diagrams illustrating the replacement of the logical volume 42 to be replaced.

When the usage rate of the cache memory 31 is equal to or higher than the predetermined usage rate threshold value, the specifying unit 36, as illustrated in FIGS. 3A and 3B, specifies a physical volume PLU #1 whose value of the first counter 34 is equal to or larger than the data number threshold value of five. The specifying unit 36 specifies an MLU #1 having a larger value of the second counter 35 among logical volumes MLU #0 and the MLU #1 placed in the PLU #1.

The specifying unit 36 compares time stamps time #1, time #5, and time #6 of dirty data Data #1, Data #5 and Data #6 of the MLU #1 in the LRU table 33 with the current time. When it is assumed that time #1, time #5, and time #6 all are earlier than the current time by the predetermined time or more, the specifying unit 36 specifies the MLU #1 to be replaced.

As illustrated in FIGS. 4A and 4B, the selecting unit 37 specifies a physical volume PLU #4 as the physical volume 41 of the replacement destination and specifies the MLU #1 placed in a physical volume PLU #2 as the logical volume 42 of the data read source.

The replacement unit 38 configures the new MLU #1 in the PLU #4, reads the data from the MLU #1 of the PLU #2, copies the data into the MLU #1 of the PLU #4. Then, when the copying is completed, the replacement unit 38 deletes the MLU #1 of the PLU #1 and sets the MLU #1s constituted with the PLU #2 and the PLU #4 as a pair of the RAID-1.

Figure 5:
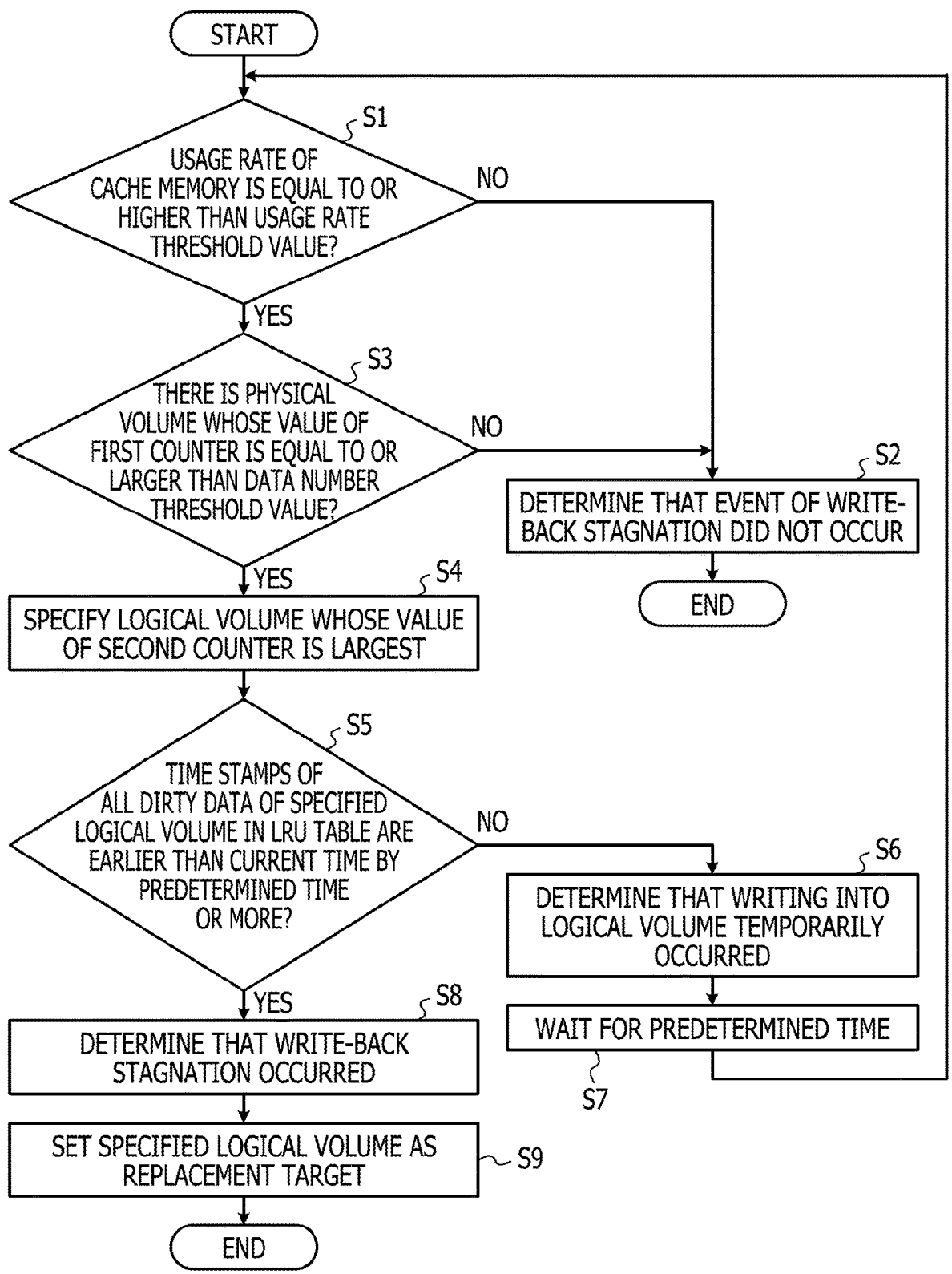
FIG. 5 is a flowchart illustrating a flow of processing by a specifying unit.

Next, a flow of processing by the specifying unit 36 will be described. FIG. 5 is a flowchart illustrating a flow of processing by the specifying unit 36. As illustrated in FIG. 5, the specifying unit 36 determines whether or not the usage rate of the cache memory 31 is equal to or higher than the usage rate threshold value (step S1), and when the usage rate is not equal to or higher than the usage rate threshold value, the specifying unit 36 determines that an event of the write-back stagnation did not occur (step S2), and the processing is terminated.

On the other hand, when the usage rate of the cache memory 31 is equal to or higher than the usage rate threshold value, the specifying unit 36 determines whether or not there is a physical volume 41 whose value of the first counter 34 is equal to or larger than the data number threshold value (step S3). When there is no physical volume 41 whose value of the first counter 34 is equal to or larger than the data number threshold value, the specifying unit 36 moves to the step S2.

On the other hand, when there is the physical volume 41 whose value of the first counter 34 is equal to or larger than the data number threshold value, the specifying unit 36 specifies the logical volume 42 whose value of the second counter 35 is the largest, among the logical volumes 42 placed in the physical volume 41 (step S4). When there are a plurality of physical volumes 41 whose values of the first counter 34 are equal to or larger than the data number threshold value, the specifying unit 36 selects, for example, the physical volume 41 having the largest value of the first counter 34 and performs the processing of the step S4.

The specifying unit 36 determines whether or not the time stamps of all the dirty data 31a of the specified logical volume 42 in the LRU table 33 are earlier than the current time by the predetermined time or more (step S5). When there is a time stamp which is not earlier than the current time by the predetermined time or more among the time stamps of the dirty data 31a of the specified logical volume 42, the specifying unit 36 determines that writing into the logical volume 42 temporarily occurred (step S6). The specifying unit 36 waits for the predetermined time (step S7), and the dirty data 31a is written back by waiting for the predetermined time, a state of the usage area of the cache memory 31 changes, and the process returns to the step S1.

On the other hand, when the time stamps of all the dirty data 31a of the specified logical volume 42 are earlier than the current time by the predetermined time or more, the specifying unit 36 determines that the write-back stagnation occurred (step S8). The specifying unit 36 sets the specified logical volume 42 as a replacement target (step S9).

In this manner, the specifying unit 36 may specify the logical volume 42 to be replaced by using the first counter 34, the second counter 35, and the LRU table 33.

Figure 6:
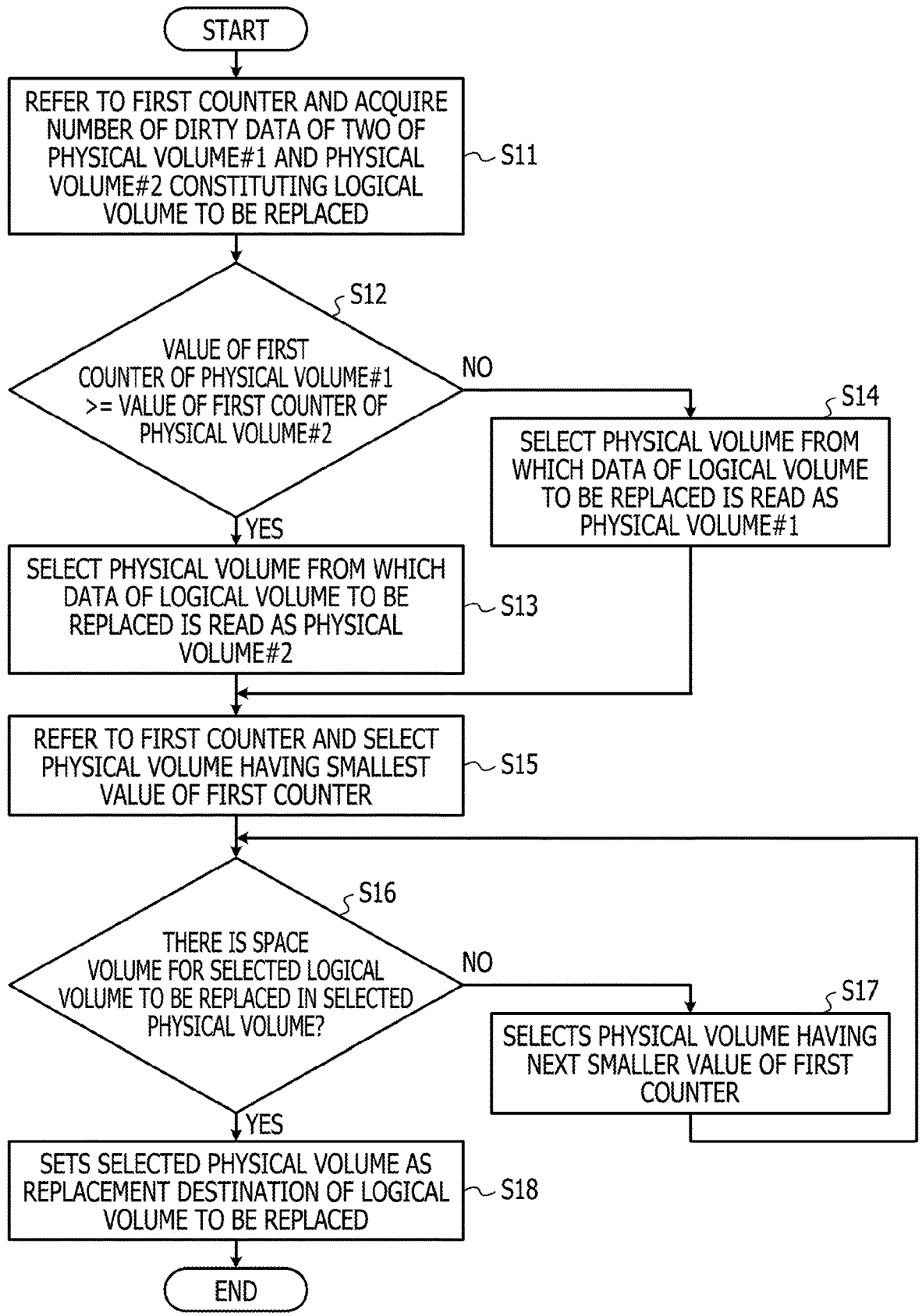
FIG. 6 is a flowchart illustrating a flow of processing by a selecting unit.

Next, a flow of processing by the selecting unit 37 will be described. FIG. 6 is a flowchart illustrating the flow of the processing by the selecting unit 37. As illustrated in FIG. 6, the selecting unit 37 refers to the first counter 34 and acquires the number of the dirty data of two of a physical volume #1 and a physical volume #2 constituting the logical volume 42 to be replaced (step S11).

The selecting unit 37 determines whether or not a value of the first counter 34 of the physical volume #1 is equal to or larger than a value of the first counter 34 of the physical volume #2 (step S12). When the value of the first counter 34 of the physical volume #1 is equal to or larger than the value of the first counter 34 of the physical volume #2, the selecting unit 37 selects the physical volume 41 from which the data of the logical volume 42 to be replaced is read as the physical volume #2 (step S13). On the other hand, when the value of the first counter 34 of the physical volume #1 is not equal to or larger than the value of the first counter 34 of the physical volume #2, the selecting unit 37 selects the physical volume 41 from which the data of the logical volume 42 to be replaced is read as the physical volume #1 (step S14).

The selecting unit 37 refers to the first counter 34, selects the physical volume 41 having the smallest value of the first counter 34 (step S15), and determines whether or not there is a space volume for the selected logical volume to be replaced in the selected physical volume 41 (step S16). When there is no space volume for the logical volume to be replaced, the selecting unit 37 selects the physical volume 41 having the next smaller value of the first counter 34 (step S17), and the process returns to the step S16.

On the other hand, when there is the space volume for the logical volume to be replaced, the selecting unit 37 sets the selected physical volume 41 as the replacement destination of the logical volume 42 to be replaced (step S18).

In this manner, since the selecting unit 37 may specify the physical volume 41 from which the data of the logical volume 42 to be replaced is to be read and the replacement destination of the logical volume 42 to be replaced, the replacement unit 38 may perform the replacement of the logical volume 42 to be replaced.

As described above, in the embodiment, the specifying unit 36 specifies the physical volume 41 and the logical volume 42 in which the increase of the dirty data occurred due to the stagnation of the write-back of the dirty data 31a to the virtual RAID-1 device 13. The selecting unit 37 selects the physical volume 41 which is not the one physical volume 41 specified by the specifying unit 36, among the two physical volumes 41 in which the logical volume 42 specified by the specifying unit 36 is placed, as the physical volume 41 of the read source from which the data is read. The selecting unit 37 selects the physical volume 41 having the smallest value of the first counter 34 as the physical volume 41 of the replacement destination. The replacement unit 38 reads the data from the physical volume 41 as the read source and writes the data in the physical volume 41 of the replacement destination, thereby creating the copy of the logical volume 42 in the physical volume 41 of the replacement destination. The replacement unit 38 deletes the logical volume 42 whose copy is created, from the physical volume 41 specified by the specifying unit 36. Therefore, when the logical volume 42 is replaced, the storage device 1 may reduce the data read of the logical volume 42 from the physical volume 41 with the high load.

In addition, in the embodiment, the specifying unit 36 specifies the physical volume 41 whose value of the first counter 34 is equal to or larger than the data number threshold value, and specifies the logical volume 42 having the largest value of the second counter 35 among the logical volumes 42 placed in the specified physical volume 41. The specifying unit 36 determines whether all the time stamps of the dirty data 31a included in the specified logical volume 42 among the cache pages having the cache page information in the LRU table 33 are earlier than the current time by the predetermined time or more. When all the time stamps are earlier than the current time by the predetermined time or more, the specifying unit 36 specifies the specified physical volume 41 and the specified logical volume 42 as the physical volume 41 and the logical volume 42 in which the increase in the dirty data occurs due to the stagnation of the write-back. Therefore, the specifying unit 36 may accurately specify the physical volume 41 and the logical volume 42 in which the bias of the I/O occurs due to the stagnation of the write-back.

In the embodiment, since the selecting unit 37 selects the physical volume 41 having the smaller value of the first counter 34 as the physical volume 41 of the read source, the physical volume 41 of the read source may be accurately specified.

A function of the CM 12 illustrated in FIG. 2 is realized by executing a storage control program including a plurality of instructions by a central processing unit (CPU) included in the CM 12. Accordingly, the hardware configuration of the CM 12 will be described.

Figure 7:
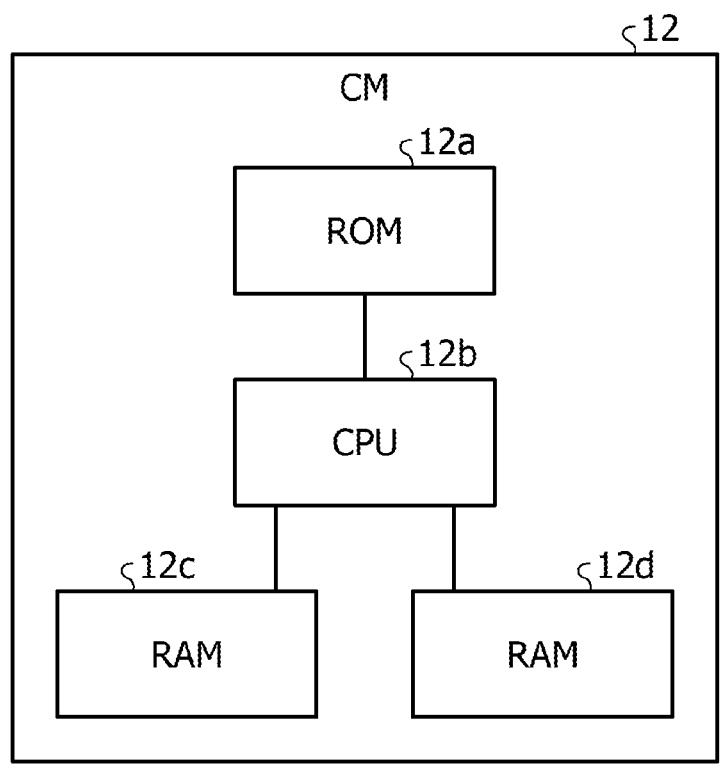
FIG. 7 is a diagram illustrating a hardware configuration of a CM.

FIG. 7 is a diagram illustrating the hardware configuration of the CM 12. As illustrated in FIG. 7, the CM 12 has a read only memory (ROM) 12a, a CPU 12b, a random access memory (RAM) 12c, and a RAM 12d.

The ROM 12a is a nonvolatile storage device that stores a storage control program. The CPU 12b is a central processing unit which reads and executes a program from the RAM 12c. The RAM 12c is a memory which stores the program, an intermediate result of executing the program, and the like. The RAM 12d is a memory used as the cache memory 31.

The storage control program is read from the ROM 12a to the RAM 12c, read from the RAM 12c by the CPU 12b, and executed. Alternatively, the CM 12 may have a CD drive instead of the ROM 12a, and the storage control program may be stored in a CD-R as an example of a recording medium readable by the CPU 12b, read by the CD drive from the CD-R, and stored in the RAM 12c. The storage control program stored in the RAM 12c is read and executed by the CPU 12b.

In the embodiment, the case where the logical volume 42 is mirrored to the two physical volumes 41 has been described, but the storage device 1 may mirror the logical volume 42 to three or more physical volumes 41.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage device comprising:
a cache memory; and
a processor coupled to the cache memory and the processor configured to
perform, in accordance with an amount of dirty data stored in the cache memory, the dirty data being not written back to a nonvolatile storage device, a determination of a first physical volume and a first logical volume placed in the first physical volume from the plurality of physical volumes and the plurality of logical volumes placed in the plurality of physical volumes,
perform selection, from a first plurality of physical volumes in which the determined first logical volume is placed by mirroring, of a second physical volume other than the determined first physical volume as a read source, and perform selection, from the plurality of physical volumes, of a third physical volume other than the second plurality of physical volumes as a write destination, and
write data of the first logical volume read from the second physical volume selected as the read source, to the third physical volume selected as the write destination, and delete the first logical volume from the determined first physical volume.

2. The storage device according to claim 1, wherein the amount of the dirty data includes a plurality of first values obtained by counting a number of the dirty data for each of the plurality of physical volumes, and a plurality of second values obtained by counting a number of the dirty data for each of the plurality of logical volumes.

3. The storage device according to claim 2, wherein
the determination is performed in accordance with the plurality of first values, the plurality of second values, and a time stamp when each the dirty data is updated.

4. The storage device according to claim 3, wherein
the determination includes determining the first physical volume of the first value no less than a first threshold value and determining the first logical volume having a largest second value among a first plurality of logical volumes placed in the determined first physical volume, and a time stamp of the dirty data related to the first logical volume indicates a time earlier than a certain period prior to a current time.

5. The storage device according to claim 2, wherein
the selection of the third physical volume includes selecting the third physical volume having the smallest first value, from one or more physical volumes having storage capacity no less than an amount of the first logical volume among the plurality of physical volumes.

6. The storage device according to claim 1, wherein
the determination is executed when a usage rate of the cache memory is no less than a second threshold value.

7. A computer-implemented storage method comprising:
determining, in accordance with an amount of dirty data stored in a cache memory, the dirty data being not written back to a nonvolatile storage device, a first physical volume and a first logical volume placed in the first physical volume from the plurality of physical volumes and the plurality of logical volumes placed in the plurality of physical volumes;

selecting, from a first plurality of physical volumes in which the determined first logical volume is placed by mirroring, a second physical volume other than the determined first physical volume as a read source, and selecting, from the plurality of physical volumes, a third physical volume other than the second plurality of physical volumes as a write destination; and writing data of the first logical volume read from the second physical volume selected as the read source, to the third physical volume selected as the write destination, and deleting the first logical volume from the determined first physical volume.

8. The storage method according to claim 7, wherein
the amount of the dirty data includes a plurality of first values obtained by counting a number of the dirty data for each of the plurality of physical volumes, and a plurality of second values obtained by counting a number of the dirty data for each of the plurality of logical volumes.

9. The storage method according to claim 8, wherein
the determining is performed in accordance with the plurality of first values, the plurality of second values, and a time stamp when each the dirty data is updated.

10. The storage method according to claim 9, wherein
the determining includes determining the first physical volume of the first value no less than a first threshold value and determining the first logical volume having a largest second value among a first plurality of logical volumes placed in the determined first physical volume, and a time stamp of the dirty data related to the first logical volume indicates a time earlier than a certain period prior to a current time.

11. The storage method according to claim 8, wherein
the selecting of the third physical volume includes selecting the third physical volume having the smallest first value, from one or more physical volumes having storage capacity no less than an amount of the first logical volume among the plurality of physical volumes.

12. The storage method according to claim 7, wherein
the determining is executed when a usage rate of the cache memory is no less than a second threshold value.

13. A non-transitory computer-readable medium storing instructions executable by one or more computers, the instructions comprising:
one or more instructions for determining, in accordance with an amount of dirty data stored in a cache memory, the dirty data being not written back to a nonvolatile storage device, a first physical volume and a first logical volume placed in the first physical volume from the plurality of physical volumes and the plurality of logical volumes placed in the plurality of physical volumes;

one or more instructions for selecting, from a first plurality of physical volumes in which the determined first logical volume is placed by mirroring, a second physical volume other than the determined first physical volume as a read source, and selecting, from the plurality of physical volumes, a third physical volume other than the second plurality of physical volumes as a write destination; and one or more instructions for writing data of the first logical volume read from the second physical volume selected as the read source, to the third physical volume selected as the write destination, and deleting the first logical volume from the determined first physical volume.

* * * * *